United States Patent
Gao et al.

(10) Patent No.: US 9,916,391 B2
(45) Date of Patent: Mar. 13, 2018

(54) METHOD, APPARATUS AND TERMINAL FOR WEBPAGE CONTENT BROWSING

(71) Applicant: TENCENT TECHNOLOGY (SHENZHEN) COMPANY LIMITED, Shenzhen (CN)

(72) Inventors: Yang Gao, Shenzhen (CN); Huijiao Yang, Shenzhen (CN); Yi Chen, Shenzhen (CN); Hao Tang, Shenzhen (CN); Bo Hu, Shenzhen (CN); Lei Guan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 457 days.

(21) Appl. No.: 14/622,003

(22) Filed: Feb. 13, 2015

(65) Prior Publication Data

US 2015/0154314 A1    Jun. 4, 2015

Related U.S. Application Data

(63) Continuation of application No. PCT/CN2014/082488, filed on Jul. 18, 2014.

(30) Foreign Application Priority Data

Jul. 22, 2013   (CN) .......................... 2013 1 0309048

(51) Int. Cl.
*G06F 17/00*   (2006.01)
*G06F 17/30*   (2006.01)

(52) U.S. Cl.
CPC .. *G06F 17/30905* (2013.01); *G06F 17/30882* (2013.01)

(58) Field of Classification Search
CPC ..................... G06F 17/30899; G06F 17/30905
See application file for complete search history.

(56) References Cited

U.S. PATENT DOCUMENTS

| | | | | |
|---|---|---|---|---|
| 8,250,653 B2* | 8/2012 | Wang | ...................... | G06F 9/468 |
| | | | | 713/164 |
| 8,913,984 B2* | 12/2014 | Cho | ........................ | G01C 21/26 |
| | | | | 455/404.1 |

(Continued)

FOREIGN PATENT DOCUMENTS

| CN | 101106774 A | 1/2008 |
|---|---|---|
| CN | 101137079 A | 3/2008 |

(Continued)

OTHER PUBLICATIONS

Grier et al., "Designing and Implementing the OP and OP2 Web Browsers" copyright 2011 ACM, ACM Transactions on the Web, vol. 5, No. 2, Article 11, Publication date: May 2011, 35 pages.*

(Continued)

*Primary Examiner* — Amelia L Tapp
(74) *Attorney, Agent, or Firm* — Anova Law Group, PLLC

(57) ABSTRACT

A method for webpage content browsing is provided. The method includes a terminal receiving a browsing request inputted by a user through performing an operation on a webpage link in a task window of an application, where the browsing request contains the webpage link. The method also includes the terminal parsing the browsing request to obtain the webpage link included in the browsing request. Further, the method includes the terminal generating a browsing window process, creating a browsing window using the browsing window process and attaching the browsing window to the task window. In addition, the method includes the terminal obtaining the webpage con- (Continued)

tents corresponding to the webpage link and outputting the webpage contents to the browsing window.

13 Claims, 5 Drawing Sheets

(56) References Cited

U.S. PATENT DOCUMENTS

| | | | | |
|---|---|---|---|---|
| 2008/0040426 | A1* | 2/2008 | Synstelien | G06F 9/4443 709/203 |
| 2009/0109184 | A1* | 4/2009 | Kim | G06F 3/04815 345/173 |
| 2012/0209693 | A1* | 8/2012 | Duthoit | G06Q 30/0267 705/14.41 |
| 2013/0198260 | A1* | 8/2013 | Dow | G06Q 10/063114 709/203 |

FOREIGN PATENT DOCUMENTS

| | | |
|---|---|---|
| CN | 101504648 A | 8/2009 |
| CN | 101719125 A | 6/2010 |
| CN | 102098234 A | 6/2011 |
| CN | 102200971 A | 9/2011 |
| CN | 102663081 A | 9/2012 |
| CN | 102946346 A | 2/2013 |
| CN | 103064738 A | 4/2013 |
| CN | 103176775 A | 6/2013 |
| TW | 201032071 A1 | 9/2010 |
| TW | 201314577 A1 | 4/2013 |

OTHER PUBLICATIONS

State Intellectual Property Office of the P.R.C (SIPO) Office Action 1 for 201310309048.6 dated Jan. 26, 2017 p. 1-9.
The World Intellectual Property Organization (WIPO) International Search Report for PCT/CN2014/082488 dated Oct. 24, 2014.
Taiwan Intellectual Property Office (TIPO) Office Action 1 for 103124161 dated May 14, 2015.
The State Intellectual Property Office of the Peoples Republic of China (SIPO) Office Action 2 for 201310309048.6 dated Aug. 18, 2017 pp. 1-13.

* cited by examiner

METHOD, APPARATUS AND TERMINAL FOR WEBPAGE CONTENT BROWSING

CROSS-REFERENCES TO RELATED APPLICATIONS

This application is a continuation application of PCT Patent Application No. PCT/CN2014/082488, filed on Jul. 18, 2014, which claims priority of Chinese Patent Application No. 201310309048.6, filed on Jul. 22, 2013, the entire contents of which are incorporated by reference herein.

FIELD OF THE INVENTION

The present invention generally relates to the field of Internet technologies and, more particularly, to methods, apparatuses and terminals for webpage content browsing.

BACKGROUND

Currently, more and more applications (also called application programs) on smart phones (e.g., Android phones, iOS phones) become available, and most of the applications allow users to call a browser to browse webpage contents. However, in practical applications, when a user calls a browser to browse webpage contents in an application, the smart phone needs to launch the browser independently, consuming a lot of network flow. Also, the speed of launching the browser is relatively slow, thus the webpage contents cannot be quickly browsed.

The disclosed methods, apparatuses and terminals are directed to solve one or more problems set forth above and other problems.

BRIEF SUMMARY OF THE DISCLOSURE

One aspect of the present disclosure includes a method for webpage content browsing. The method includes a terminal receiving a browsing request inputted by a user through performing an operation on a webpage link in a task window of an application, where the browsing request contains the webpage link. The method also includes the terminal parsing the browsing request to obtain the webpage link included in the browsing request. Further, the method includes the terminal generating a browsing window process, creating a browsing window using the browsing window process and attaching the browsing window to the task window. In addition, the method includes the terminal obtaining the webpage contents corresponding to the webpage link and outputting the webpage contents to the browsing window.

Another aspect of the present disclosure includes an apparatus for webpage content browsing. The apparatus includes a receiving unit configured to receive a browsing request inputted by a user through performing an operation on a webpage link in a task window of an application, where the browsing request contains the webpage link and a parsing unit configured to parse the browsing request to obtain the webpage link contained in the browsing request. The apparatus also includes a generating unit configured to generate a browsing window process and create a browsing window using the browsing window process and an attaching unit configured to attach the browsing window on the task window. Further, the apparatus includes an output unit configured to obtain the webpage contents corresponding to the webpage link and output the webpage contents to the browsing window.

Another aspect of the present disclosure includes a terminal for webpage content browsing. The terminal includes a receiving unit configured to receive a browsing request inputted by a user through performing an operation on a webpage link in a task window of an application, where the browsing request contains the webpage link and a parsing unit configured to parse the browsing request to obtain the webpage link contained in the browsing request. The terminal also includes a generating unit configured to generate a browsing window process and create a browsing window using the browsing window process and an attaching unit configured to attach the browsing window on the task window. Further, the terminal includes an output unit configured to obtain the webpage contents corresponding to the webpage link and output the webpage contents to the browsing window.

Other aspects of the present disclosure can be understood by those skilled in the art in light of the description, the claims, and the drawings of the present disclosure.

BRIEF DESCRIPTION OF THE DRAWINGS

In order to describe the technical solution of the embodiments of the present invention more clearly, drawings used in the description of the embodiments are introduced below. The drawings described below are merely some exemplary embodiments of the present invention. For those skilled in the art, on the premise of no inventive effort being involved, other drawings may also be obtained according to these drawings and the descriptions included herein.

DETAILED DESCRIPTION

In the following description, for purposes of illustration, many specific details are illustrated in order to provide a full understanding of one or more embodiments. However, obviously, those embodiments can also be implemented in the case of these specific details changed, replaced, or alternated. The followings, together with accompanying drawings, describe in detail certain embodiments of the present invention.

As used herein, a "transparent window" may cover on a current window and become a foreground window. The original window becomes a background window. The foreground window has the same direction property as the background window.

As used herein, the term "task" refers to a basic executing computational unit that processes on a CPU and state of which is under the control of kernel of an operating system. The task may be an entire program or each successive invocation of a program. In general, a computer application program may include one or more tasks, and each task is independent. A user may switch from one task to another task.

As used herein, the term "process" in this disclosure refers to an instance of a computer program that is being executed. The process contains the program code and its current activity. An activity is attached to at least one process, and one process may have multiple activities. Further, an activity may be attached to multiple tasks.

As used herein, unless otherwise specified, the term "terminal device" in this disclosure may also be referred to as "terminal".

Figure 5:
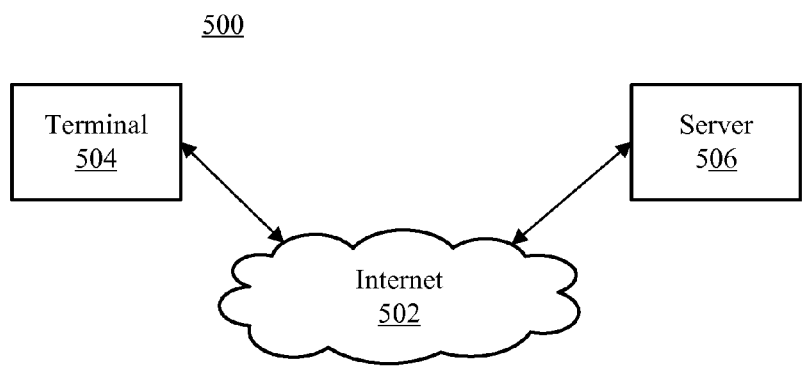
FIG. 5 shows an environment incorporating certain aspects of the present invention.

FIG. 5 shows an environment incorporating certain aspects of the present invention. As shown in FIG. 5, environment 500 may include a terminal device 504, a server 506, and the Internet 502. The terminal device 504 may access the server 506 through the Internet 502 for certain personalized services provided by the server 506. Although only one server 506 and one terminal device 504 are shown in the environment 500, any number of terminal devices 504 or servers 506 may be included, and other devices may also be included.

The Internet 502 may include any appropriate type of communication network for providing network connections to the terminal device 504 and the server 506 or among multiple terminal devices 504 and servers 506. For example, Internet 502 may include the Internet or other types of computer networks or telecommunication networks, either wired or wireless.

A terminal device, as used herein, may refer to any appropriate user terminal with certain computing capabilities, such as a personal computer (PC), a work station computer, a server computer, a hand-held computing device (tablet), a smart phone or mobile phone, or any other user-side computing device. In certain embodiments, terminal device 504 may be a mobile terminal device, such as a smart phone, a tablet computer, or a mobile phone, etc. Terminal device 504 may be implemented on any appropriate computing platform.

A server, as used herein, may refer to one or more server computers configured to provide certain web server functionalities for webpage content browsing. A server may also include one or more processors to execute computer programs in parallel. The server may store webpages to be accessed by the terminal devices, and each of these webpages has a unique web address. The unique web address is also called Uniform Resource Locator (URL).

After receiving a browsing request inputted by a user through performing an operation for a webpage link on the task window of the application, the terminal device parses the browsing request to obtain the webpage link contained in the browsing request. Then, the terminal device generates the browsing window process and creates the browsing window using the browsing window process. The created browsing window is attached on the task window. The webpage contents corresponding to the webpage link is obtained and outputted to the browsing window. Thus, the webpage browsing effect and the browsing experience of the user are improved.

Figure 6:
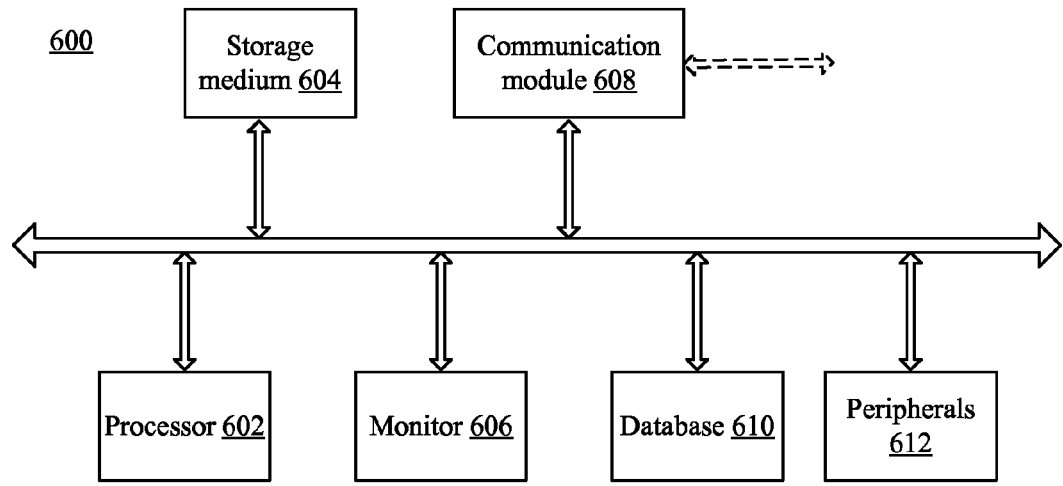
FIG. 6 shows a block diagram illustrating an exemplary computing system consistent with the disclosed embodiments.

FIG. 6 shows a block diagram illustrating an exemplary computing system capable of implementing the terminal device 504 and/or the server 506 consistent with the disclosed embodiments. As shown in FIG. 6, the exemplary computer system 600 may include one or more processors 602, a storage medium 604, a monitor 606, a communication module 608, a database 610, peripherals 612, and one or more bus 614 to couple the devices together. Certain devices may be omitted and other devices may be included.

The processor 602 can include any appropriate processor or processors. Further, the processor 602 can include multiple cores for multi-thread or parallel processing. For example, the processor 602 may generate a browsing window process. The storage medium 604 may include memory modules, such as ROM, RAM, and flash memory modules, and mass storages, such as CD-ROM, U-disk, removable hard disk, etc. The storage medium 604 may store computer programs (e.g., a browser) for implementing various processes, when executed by the processor 602.

The monitor 606 may include display devices for displaying information. For example, the monitor 606 of the terminal device 504 can be used by a user to display browser windows, webpage contents, etc. The communication module 608 may include network devices for establishing connections through the communication network 502. The database 610 may include one or more databases for storing certain data and for performing certain operations on the stored data. Further, the peripherals 612 may include I/O devices such as keyboard and mouse.

Figure 1:
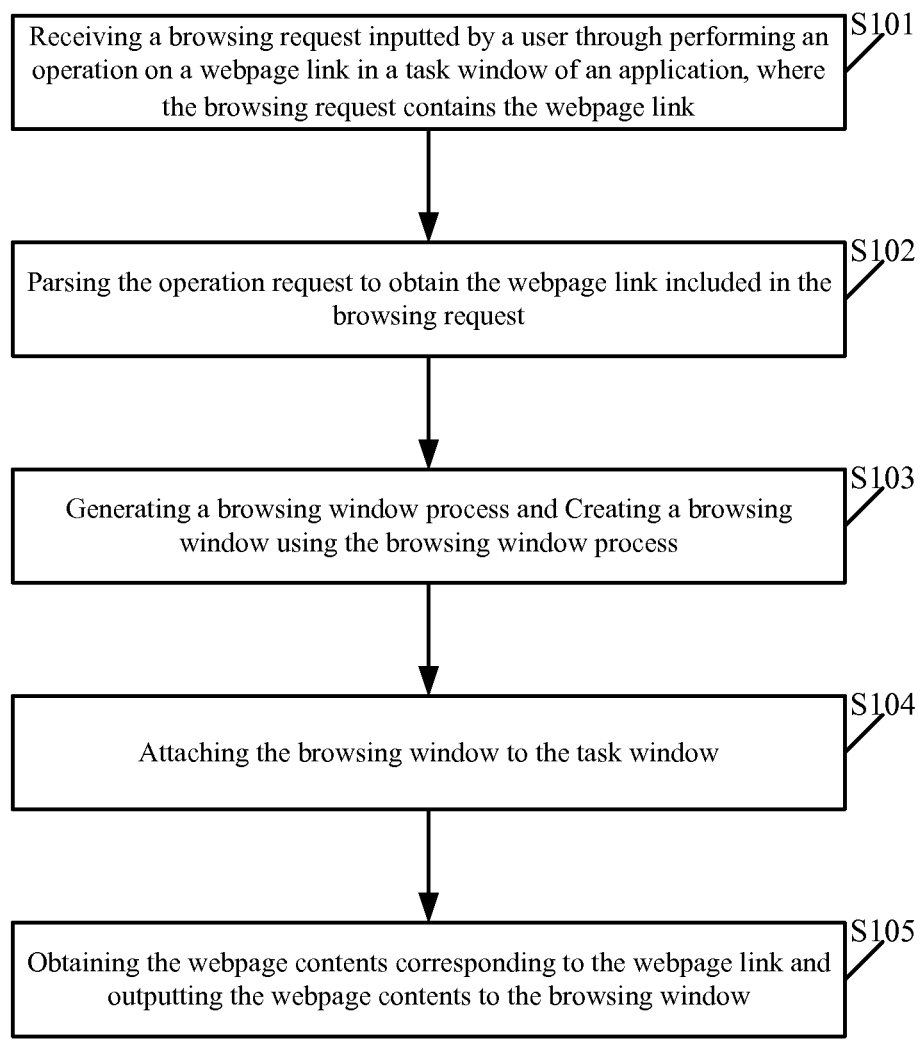
FIG. 1 illustrates a flow chart of an exemplary webpage content browsing process consistent with the disclosed embodiments.

In various embodiments, a terminal device such as a user-side electronic device involved in the disclosed embodiments can include the terminal device 504. FIG. 1 illustrates a flow chart of an exemplary webpage content browsing process consistent with the disclosed embodiments. The webpage content browsing process may apply to any appropriate user terminal device with certain computing capabilities, such as a smartphone (e.g., an Android mobile phone, an iOS mobile phone, etc.), a Tablet personal computer (PC), a Pocket PC, a Mobile Internet Device (MID) and a Personal Access Device (PAD), or any other user-side computing device. There are no specific limitations on the terminal device. As shown in FIG. 1, the webpage content browsing process may include the following steps.

S101: receiving a browsing request inputted by a user through performing an operation on a webpage link on a task window of an application, where the browsing request contains the webpage link.

The user may perform a single-click operation, a double-click operation, or a drag operation, etc., on the webpage link in the task window of the application to input the browsing request containing the webpage link to the terminal device.

S102: the browsing request is parsed to obtain the webpage link included in the browsing request.

After the terminal device receives the browsing request inputted by the user for performing the operation on the webpage link in the task window of the application, the terminal device parses the browsing request to obtain the webpage link contained in the browsing request.

The terminal device can load a browser kernel to parse the browsing request to obtain the webpage link contained in the browsing request.

In addition, before the terminal device loads the browser kernel to parse the browsing request to obtain the webpage link contained in the browsing request, the terminal device may call a browser package and install the browser kernel to provide functions for the user.

S103: a browsing window process is generated, and a browsing window is created using the browsing window process.

After the terminal device installs the browser kernel, the terminal device may call a process creating function (e.g., a fork function) of the browser package to generate the browsing window process. Then, the browsing window is created using the browsing window process.

The browsing window created by the terminal device using the browsing window process runs in a specified independent process without occupying program space of the application.

S104: the browsing window is attached to the task window.

The terminal device may overlap the browsing window on the task window and the browsing window may become a transparent browsing window. The terminal device may also embed the browsing window in the task window.

When multiple applications need to call the browser to browse the webpage contents, the terminal device may create an independent browsing window for each application and attach the browsing window to the task window of each application. The task windows of the multiple applications exist independently without interfering each other's browsing activity.

Further, direction property of the browsing window is the same as the direction property of the task window. In addition, styles and theme of the browsing window may also adapt to the task window. Therefore, the user does not feel the launch of the third party browser, and the user does not feel the leave of the current application scenario, bring the feeling of browsing webpage on the original application and providing a more powerful webpage parsing ability. At the same time, slow speed, large traffic volume and strong jumping feeling caused by launching the browser can be avoided.

S105: the webpage contents corresponding to the webpage link is obtained and outputted to the browsing window, with the adapted styles and theme.

In the webpage content browsing process, after receiving the browsing request inputted by the user for performing the operation on the webpage link in the task window of the application, the terminal device parses the browsing request to obtain the webpage link contained in the browsing request. Then, the terminal device generates the browsing window process and creates the browsing window using the browsing window process. The created browsing window is attached on the task window. The webpage contents corresponding to the webpage link is obtained and outputted to the browsing window. By implementing the process shown in FIG. 1, the browser does not need to be launched independently, the network traffic volume can be effectively reduced and the webpage contents can be quickly browsed. Further, the process provides the user with the browser calling experience without leaving the current application, improving the webpage browsing effect and the browsing experience of the user.

Figure 2:
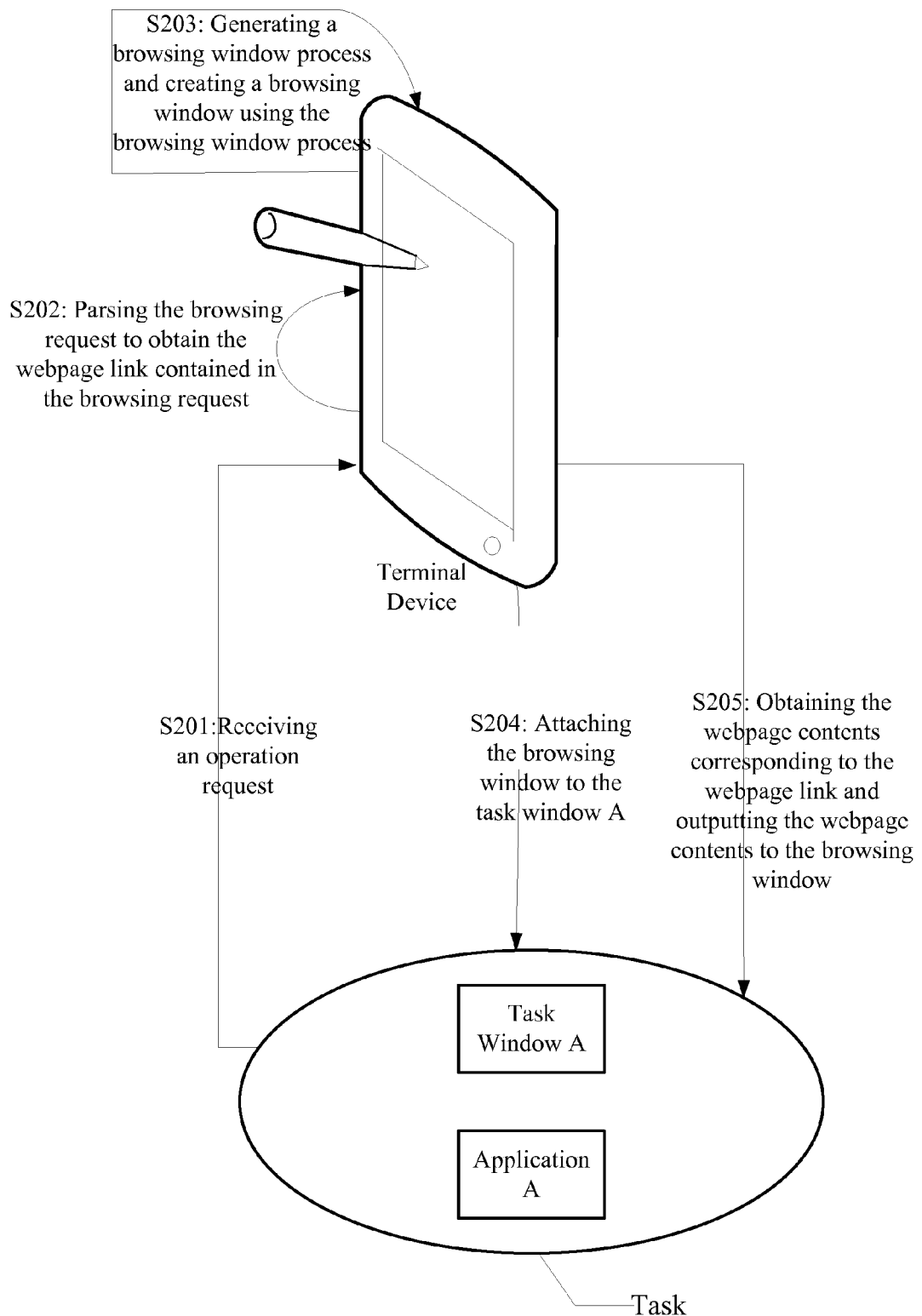
FIG. 2 illustrates a flow chart of another exemplary webpage content browsing process consistent with the disclosed embodiments.

FIG. 2 illustrates a flow chart of another exemplary webpage content browsing process consistent with the disclosed embodiments. The webpage content browsing process may apply to any appropriate user terminal device with certain computing capabilities, such as a smartphone (e.g., an Android mobile phone, an iOS mobile phone, etc.), a Tablet personal computer (PC), a Pocket PC, a Mobile Internet Devices (MID) and a Personal Access Device (PAD), or any other user-side computing device. There are no specific limitations on the terminal device. As shown in FIG. 2, the webpage content browsing process may include the following steps.

S201: a terminal device receives a browsing request inputted by a user through performing an operation on a webpage link in a task window A of an application A, where the browsing request contains the webpage link.

The user may perform a single-click operation, a double-click operation, or a drag operation on the webpage link in the task window A of the application A to input the browsing request containing the webpage link to the terminal device. Although click and drag operations are used as example, other operations may also be used. The operation on the webpage link may require the application to retrieve certain data associated with the webpage link, such as a webpage.

S202: the terminal device parses the browsing request to obtain the webpage link included in the browsing request.

After the terminal device receives browsing request inputted by the user for performing the operation on the webpage link in the task window A of the application A, the terminal device parses the browsing request to obtain the webpage link contained in the browsing request.

The terminal device can load a browser kernel to parse the browsing request to obtain the webpage link contained in the browsing request.

In addition, before the terminal device loads the browser kernel to parse the browsing request to obtain the webpage link contained in the browsing request, the terminal device may call a browser package and install the browser kernel to provide functions for the user.

S203: the terminal device generates a browsing window process and creates a browsing window using the browsing window process.

After the terminal device installs the browser kernel, the terminal device may call a process creating function of the browser to generate the browsing window process. Then, the browsing window is created using the browsing window process.

The browsing window created by the terminal device using the browsing window process runs in a specified independent process without occupying program space of the application.

S204: the terminal device attaches the browsing window to the task window A.

The browsing window may cover the task window A, in which case the browsing window is a transparent browsing window. The terminal device may also embed the browsing window in the task window A.

When multiple applications need to call the browser to browse the webpage contents, the terminal device may create an independent browsing window for each application and attach the browsing window to the task window of each application. The task windows of the multiple applications exist independently without interfering each other's browsing activity.

Figure 7:
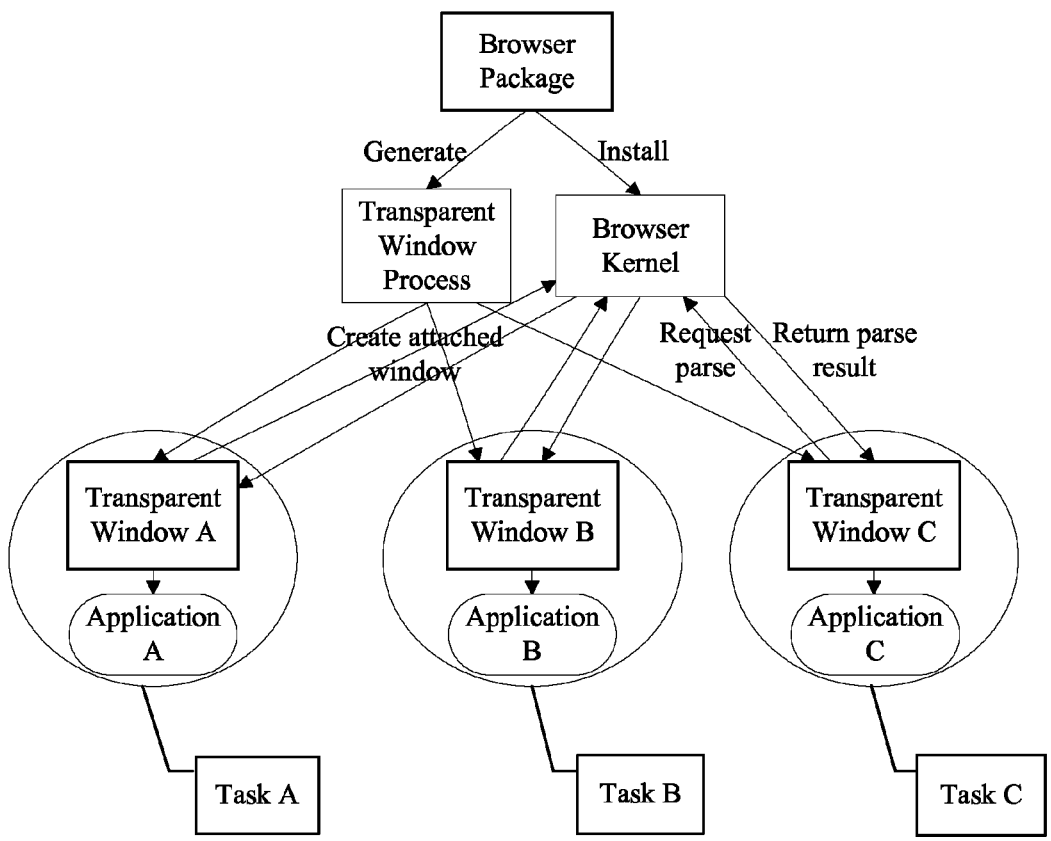
FIG. 7 illustrates a block diagram of an exemplary webpage content browsing process consistent with the disclosed embodiments.

FIG. 7 illustrates a block diagram of an exemplary webpage content browsing process consistent with the disclosed embodiments. As shown in FIG. 7, a terminal device calls a browser package and installs a browser kernel. When an application A, an application B, and an application C need to call a browser to browse webpage contents, the terminal device generates a transparent browsing window process and creates a transparent browsing window A, a transparent browsing window B, and a transparent browsing window C for the application A, the application B, and the application C using the transparent browsing window process, respectively. Further, the terminal device may also attach the transparent browsing window A, the transparent browsing window B, and the transparent browsing window C to the application A, the application B, and the application C, respectively. The task windows (i.e., a task A, a task B, and a task C) of the multiple applications A, B, and C exist independently without interfering each other's browsing activity. The terminal device can load the browser kernel to parse browsing requests from the transparent browsing window A, the transparent browsing window B, and the transparent browsing window C to obtain the webpage links contained in the browsing requests.

Returning to FIG. 2, direction property of the browsing window is the same as the direction property of the task window. In addition, styles and theme of the browsing window may also adapt to the task window A. Therefore, the user does not feel the launch of the third party browser, and the user does not feel the leave of the current application scenario, bring the feeling of browsing webpage on the original application and providing a more powerful webpage parsing ability. At the same time, low speed, large traffic volume and strong jumping feeling caused by launching the browser can be avoided.

S205: the terminal device obtains the webpage contents corresponding to the webpage link and outputs the webpage contents to the browsing window.

In the webpage content browsing process shown in FIG. 2, after receiving the browsing request inputted by the user for performing the operation on the webpage link in the task window of the application, the terminal device parses the browsing request to obtain the webpage link contained in the browsing request. Then, the terminal device generates the browsing window process and creates the browsing window using the browsing window process. The created browsing window is attached on the task window. The webpage contents corresponding to the webpage link is obtained and outputted to the browsing window. By using the method shown in FIG. 2, the browser does not need to be launched independently, the network traffic volume can be effectively saved and the webpage contents can be quickly browsed. Further, the process provides the user with the browser calling experience without leaving the current application.

Figure 3:
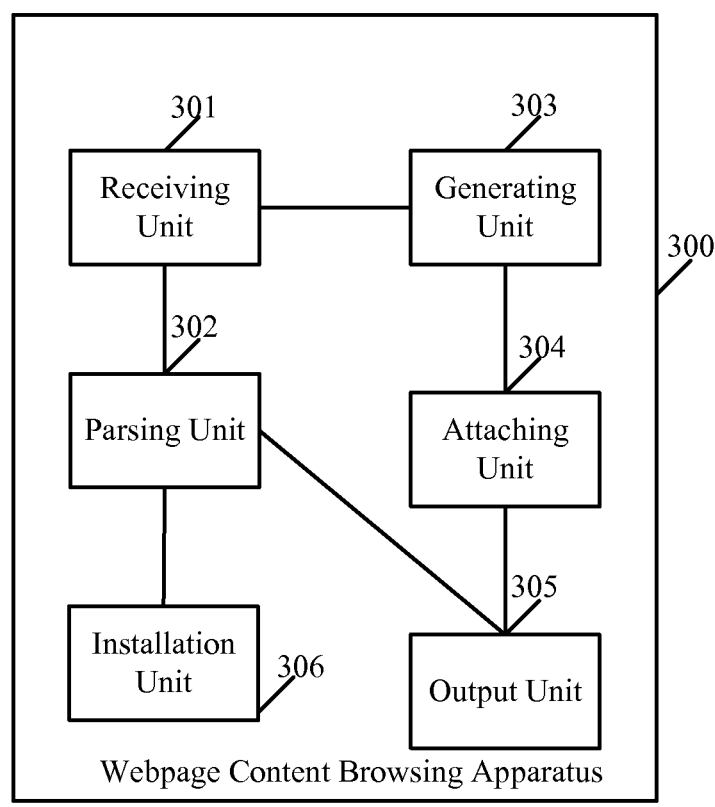
FIG. 3 illustrates a structure schematic diagram of an exemplary webpage content browsing apparatus consistent with the disclosed embodiments.

FIG. 3 illustrates a structure schematic diagram of an exemplary webpage content browsing apparatus consistent with the disclosed embodiments. The webpage content browsing apparatus may apply to any appropriate user terminal device with certain computing capabilities, such as a smartphone (e.g., an Android mobile phone, an iOS mobile phone, etc.), a Tablet personal computer (PC), a Pocket PC, a Mobile Internet Devices (MID) and a Personal Access Device (PAD), or any other user-side computing device. There are no specific limitations on the terminal device. As shown in FIG. 3, the webpage content browsing apparatus 300 may include a receiving unit 301, a parsing unit 302, a generating unit 303, an attaching unit 304, an output unit 305 and an installation unit 306.

The receiving unit 301 is configured to receive a browsing request inputted by a user through performing an operation on a webpage link in a task window of an application, where the browsing request contains the webpage link.

The parsing unit 302 is configured to parse the browsing request to obtain the webpage link contained in the browsing request. The generating unit 303 is configured to generate a browsing window process and create a browsing window using the browsing window process.

The attaching unit 304 is configured to attach the browsing window on the task window. The output unit 305 is configured to obtain the webpage contents corresponding to the webpage link and output the webpage contents to the browsing window.

The parsing unit 302 is also configured to load a browser kernel to parse the browsing request to obtain the webpage link contained in the browsing request. The installation unit 306 is configured to call a browser package and install the browser kernel.

That is, the parsing unit 302 is configured to load the browser kernel installed by the installation unit 306 and parse the browsing request to obtain the webpage link contained in the browsing request.

The generating unit 303 is configured to call a process creating function (e.g., a fork function) of the browser to generate the browsing window process, and create the browsing window using the browsing window process.

The attaching unit 304 is configured to cover the browsing window on the task window, or embed the browsing window in the task window.

Direction property of the browsing window is the same as the direction property of the task window. In addition, styles and theme of the browsing window may also adapt to the task window A. Therefore, the user does not feel the launch of the third party browser, and the user does not feel the leave of the current application scenario, bring the feeling of browsing webpage on the original application and providing a more powerful webpage parsing ability. At the same time, low speed, large traffic volume and strong jumping feeling caused by launching the browser can be avoided.

By using the webpage content browsing apparatus shown in FIG. 3, without independently launching a browser, the traffic volume can be effectively saved and the webpage contents can be quickly browsed. Further, the process provides the user with the browser calling experience without leaving the current application.

Figure 4:
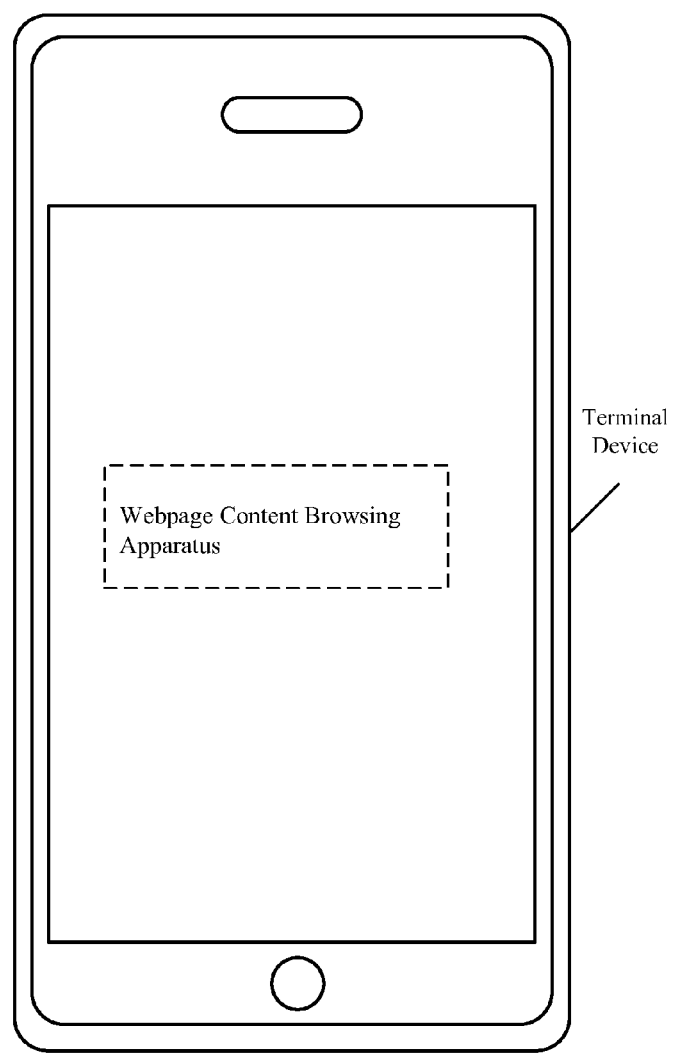
FIG. 4 illustrates a structure schematic diagram of an exemplary webpage content browsing terminal device consistent with the disclosed embodiments.

FIG. 4 illustrates a structure schematic diagram of an exemplary webpage content browsing terminal device consistent with the disclosed embodiments. As shown in FIG. 4, the terminal device may include the webpage content browsing apparatus shown in FIG. 3, where the webpage browsing apparatus includes a receiving unit, a parsing unit, a generating unit, an attaching unit, an output unit and an installation unit, etc.

The receiving unit is configured to a browsing request inputted by a user through performing an operation on a webpage link in a task window of an application, where the browsing request contains the webpage link. The parsing unit is configured to parse the browsing request to obtain the webpage link contained in the browsing request.

The generating unit is configured to generate a browsing window process and create a browsing window using the browsing window process. The attaching unit is configured to attach the browsing window on the task window. The output unit is configured to obtain the webpage contents corresponding to the webpage link and output the webpage contents to the browsing window.

The parsing unit is further configured to load a browser kernel of a browser to parse the browsing request to obtain the webpage link contained in the browsing request. The installation unit is configured to call a browser package and install the browser kernel.

The generating unit is further configured to call a process creating function of the browser to generate the browsing window process and create the browsing window using the browsing window process. The attaching unit is further configured to cover the browsing window on the task window; or embed the browsing window in the task window.

Without independently launching a browser, the terminal device may save traffic volume and quickly browse the webpage contents. Further, the terminal device may provide the user with the browser calling experience without leaving the current application.

Those skilled in the art should understand that all or part of the steps in the above method may be executed by relevant hardware instructed by a program, and the program may be stored in a computer-readable storage medium such as a removable hard disk, a read-only memory (ROM), a random access memory (RAM), a magnetic disk, an optical disk, and so on.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and apparatuses for webpage content browsing, after receiving a browsing request inputted by a user through performing an operation on a webpage link in a task window of an application, a terminal device parses the browsing request to obtain the webpage link contained in the browsing request. Then, the terminal device generates a browsing window process and creates a browsing window using the browsing window process. The created browsing window is attached on the task window. The webpage contents corresponding to the webpage link is obtained and outputted to the browsing window. Thus, the webpage browsing effect and the browsing experience of the user are improved.

What is claimed is:

1. A method for webpage content browsing, comprising:
receiving, by a terminal, a browsing request inputted by a user through performing an operation on a webpage link in a task window of an application, wherein the browsing request contains the webpage link;
parsing, by the terminal, the browsing request to obtain the webpage link included in the browsing request, comprising:
calling a browser package, and installing a browser kernel of a browser;
loading the browser kernel to parse the browsing request; and
obtaining the webpage link contained in the browsing request;
generating, by the terminal, a browsing window process without launching the browser;
creating, by the terminal, a browsing window using the browsing window process;
attaching, by the terminal, the browsing window to the task window;
obtaining, by the terminal, the webpage contents corresponding to the webpage link; and
outputting, by the terminal, the webpage contents to the browsing window.

2. The method according to claim 1, wherein generating the browsing window process and creating the browsing window using the browsing window process includes:
calling a process creating function of the browser package to generate the browsing window process; and
creating the browsing window using the browsing window process.

3. The method according to claim 1, wherein attaching the browsing window to the task window includes one of the followings:
overlapping the browsing window on the task window; or
embedding the browsing window in the task window.

4. The method according to claim 1, wherein:
direction property of the browsing window is the same as direction property of the task window.

5. The method according to claim 1, when the terminal receives more than one browsing request, further comprising:
creating an independent browsing window for each browsing request; and
attaching the independent browsing window to the task window corresponding to each browsing request.

6. An apparatus for webpage content browsing, comprising:
a memory;
a processor coupled to the memory;
a plurality of program units stored in the memory to be executed by the processor, the plurality of program units comprising:
a receiving unit configured to receive a browsing request inputted by a user through performing an operation on a webpage link in a task window of an application, wherein the browsing request contains the webpage link;
an installation unit configured to call a browser package and install a browser kernel of a browser;
a parsing unit configured to load the browser kernel to parse the browsing request, and obtain the webpage link contained in the browsing request;
a generating unit configured to generate a browsing window process and create a browsing window using the browsing window process;
an attaching unit configured to attach the browsing window on the task window; and
an output unit configured to obtain the webpage contents corresponding to the webpage link and output the webpage contents to the browsing window.

7. The apparatus according to claim 6, wherein the generating unit is further configured to:
call a process creating function of the browser to generate the browsing window process; and
create the browsing window using the browsing window process.

8. The apparatus according to claim 6, wherein the attaching unit is further configured to:
overlap the browsing window on the task window; or
embed the browsing window in the task window.

9. The apparatus according to claim 6, wherein:
direction property of the browsing window is the same as the direction property of the task window.

10. A non-transitory computer-readable medium, comprising:
   a memory;
   a processor coupled to the memory;
   a plurality of program units stored in the memory to be executed by the processor, the plurality of program units comprising:
      a receiving unit configured to receive a browsing request inputted by a user through performing an operation on a webpage link in a task window of an application, wherein the browsing request contains the webpage link;
      an installation unit configured to call a browser package and install a browser kernel of a browser;
      a parsing unit configured to load the browser kernel to parse the browsing request, and obtain the webpage link contained in the browsing request;
      a generating unit configured to generate a browsing window process and create a browsing window using the browsing window process;
      an attaching unit configured to attach the browsing window on the task window; and
      an output unit configured to obtain the webpage contents corresponding to the webpage link and output the webpage contents to the browsing window.

11. The non-transitory computer-readable medium according to claim 10, wherein the generating unit is further configured to:
   call a process creating function of the browser to generate the browsing window process; and
   create the browsing window using the browsing window process.

12. The non-transitory computer-readable medium according to claim 10, wherein the attaching unit is further configured to:
   overlap the browsing window on the task window; and
   embed the browsing window in the task window.

13. The non-transitory computer-readable medium according to claim 10, wherein:
   direction property of the browsing window is the same as the direction property of the task window.

* * * * *